United States Patent
Grbic et al.

(10) Patent No.: US 8,934,693 B2
(45) Date of Patent: Jan. 13, 2015

(54) METHOD AND SYSTEM FOR INTERVENTION PLANNING FOR TRANSCATHETER AORTIC VALVE IMPLANTATION FROM 3D COMPUTED TOMOGRAPHY DATA

(71) Applicants: Sasa Grbic, Erlangen (DE); Razvan Ioan Ionasec, Lawrenceville, NJ (US); Fernando Vega-Higuera, Erlangen (DE); Dominik Bernhardt, Hausen (DE); Bogdan Georgescu, Plainsboro, NJ (US); Dorin Comaniciu, Princeton Junction, NJ (US)

(72) Inventors: Sasa Grbic, Erlangen (DE); Razvan Ioan Ionasec, Lawrenceville, NJ (US); Fernando Vega-Higuera, Erlangen (DE); Dominik Bernhardt, Hausen (DE); Bogdan Georgescu, Plainsboro, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 13/682,820

(22) Filed: Nov. 21, 2012

(65) Prior Publication Data
US 2013/0129173 A1 May 23, 2013

Related U.S. Application Data

(60) Provisional application No. 61/563,090, filed on Nov. 23, 2011.

(51) Int. Cl.
*G06K 9/00* (2006.01)
*G06T 7/00* (2006.01)

(52) U.S. Cl.
CPC ............. *G06T 7/0012* (2013.01); *G06T 7/0046* (2013.01); *G06T 2207/10081* (2013.01); *G06T 2207/20081* (2013.01); *G06T 2207/30048* (2013.01); *G06T 2207/30101* (2013.01)
USPC ......................................... 382/131

(58) Field of Classification Search
None
See application file for complete search history.

(56) References Cited

U.S. PATENT DOCUMENTS

| 2009/0123050 A1* | 5/2009 | Ionasec et al. | 382/131 |
| 2010/0239148 A1* | 9/2010 | Zheng et al. | 382/131 |
| 2011/0222750 A1* | 9/2011 | Liao et al. | 382/131 |

* cited by examiner

*Primary Examiner* — Hadi Akhavannik (57) ABSTRACT

A method and system for automated intervention planning for transcatheter aortic valve implantations using computed tomography (CT) data is disclosed. A patient-specific aortic valve model is detected in a CT volume of a patient. The patient-specific aortic valve model is detected by detecting a global location of the patient-specific aortic valve model in the CT volume, detecting aortic valve landmarks based on the detected global location, and fitting an aortic root surface model. Angulation parameters of a C-arm imaging device for acquiring intra-operative fluoroscopic images and anatomical measurements of the aortic valve are automatically determined based on the patient-specific aortic valve model.

22 Claims, 6 Drawing Sheets

METHOD AND SYSTEM FOR INTERVENTION PLANNING FOR TRANSCATHETER AORTIC VALVE IMPLANTATION FROM 3D COMPUTED TOMOGRAPHY DATA

This application claims the benefit of U.S. Provisional Application No. 61/563,090, filed Nov. 23, 2011, the disclosure of which is herein incorporated by reference.

BACKGROUND OF THE INVENTION

The present invention relates to intervention planning for transcatheter aortic valve implantation (TAVI) using 3D computed tomography (CT) data, and more particularly, to deriving parameters for a TAVI intervention based on patient-specific anatomy detected in 3D CT data.

Valvular heart disease (VHD) affects a large number of people and often requires costly diagnostic and interventional procedures and long-term management. Aortic valve stenosis is a type of VHD in which a narrowing of the aortic valve impedes the flow of blood from the left ventricle to the aorta. In most cases of aortic valve stenosis, aortic valve replacement (AVR) is the only effective treatment. Traditionally, AVR surgery has required a major open-chest procedure that carries significant risk to the patient. Similarly, other types of VHD have traditionally been treated with surgical valve repair or replacement, as well. However, recently, there have been important advances in concepts, tools, techniques, and patient selection for treatment of VHD using non-surgical minimally invasive procedures. Such minimally invasive procedures are beginning to be used as a substitute for traditional surgical techniques. Transcatheter valve intervention, such as Transcatheter Aortic Valve Implantation (TAVI), offers the potential to reduce procedural morbidity, mortality, and costs of surgical valve replacement or repair, while accelerating patient recovery.

TAVI can be utilized for aortic valve replacement in high-risk surgical patients. However, without direct access and view of the affected aortic valve, such interventions are guided by advanced real-time imaging equipment, such as C-arm fluoroscopic imaging. An orthogonal view of the aortic valve in the C-arm fluoroscopy images is typically used to allow the physician to determine the optimal deployment location of the artificial aortic valve. In current clinical practice, the angulation parameters of the C-arm imaging system are determined manually by the physician to achieve the desired view in the intra-operative C-arm fluoroscopy images.

BRIEF SUMMARY OF THE INVENTION

The present invention provides a method and system for automatic intervention planning for transcatheter aortic valve implantation (TAVI) using 3D computed tomography (CT) data. Embodiments of the present invention automatically detect a patient-specific model of the aortic valve from single phase CT data and automatically derive angulation parameters for an intra-operative C-arm fluoroscopy device based on the patient-specific model of the aortic valve. Embodiments of the present invention also automatically determine diameter and circumferential measurements based on the patient-specific model of the aortic valve that can be used to select proper implant dimensions.

In one embodiment of the present invention, a patient-specific aortic valve model is detected in a CT volume of a patient. At least one intervention parameter is automatically determined based on the patient-specific aortic valve model. The patient-specific aortic valve model may be detected by detecting a global location of the patient-specific aortic valve model in the CT volume, detecting aortic valve landmarks in the CT volume based on the detected global location, and fitting an aortic root surface model to the CT volume.

These and other advantages of the invention will be apparent to those of ordinary skill in the art by reference to the following detailed description and the accompanying drawings.

DETAILED DESCRIPTION

The present invention relates to a method and system for automatic intervention planning for transcatheter aortic valve implantation (TAVI) using 3D computed tomography (CT) data. Embodiments of the present invention are described herein to give a visual understanding of the automatic intervention planning method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention automatically detect a patient-specific model of the aortic valve from single phase CT data and automatically determine angulation parameters for an intra-operative C-arm fluoroscopy device and anatomical measurements of the aortic valve based on the patient-specific model of the aortic valve. Embodiments of the present invention utilize a fully automated patient-specific aortic valve modeling and estimation framework the TAVI intervention planning. This framework relies on a physiological model of the aortic valve, which includes an explicit representation and captures a large variety of anatomical and pathological variations. Embodiments of the present invention utilize a robust and efficient discriminative learning-based system to extract patient-specific parameters of the aortic valve model from CT data. The patient-specific aortic valve model estimation is formulated as a multi-scale problem through which models of increasing complexity are progressively learned. Based on the patient-specific modeling techniques, the clinical workflow of TAVI planning is supported and automated. The machine learning algorithms described herein can be supported by a large database of CT medical images from patients affected by a large spectrum of aortic valve diseases including patients with severe stenosis and calcifications. Embodiments of the present invention provide an integrated solution to simplify and accelerate the TAVI planning procedure.

Figure 1:
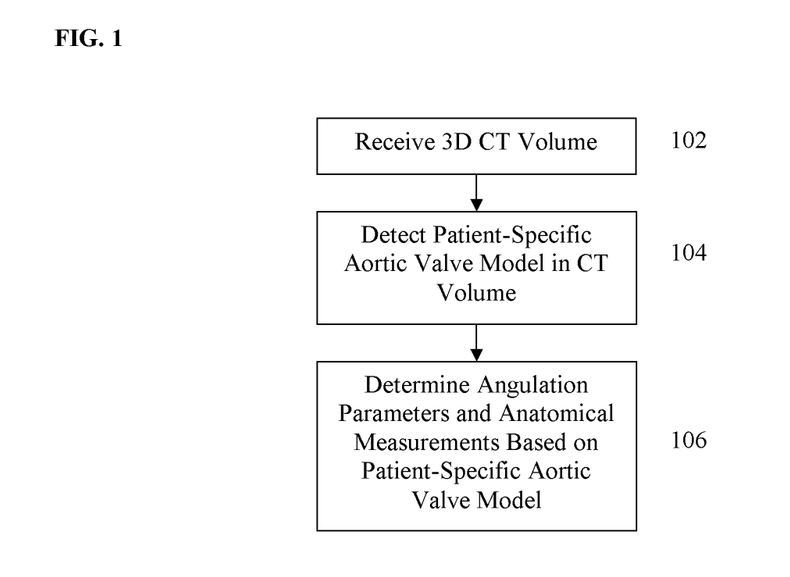
FIG. 1 illustrates a method for automated TAVI planning according to an embodiment of the present invention.

FIG. 1 illustrates a method for automated TAVI planning according to an embodiment of the present invention. As illustrated in FIG. 1, at step 102, a 3D CT volume is received. The CT volume can be a pre-operative CT volume including at least a cardiac region of a patient. The CT volume can be received directly from a CT scanner or can be received by loading a previously stored CT volume of the patient.

Figure 2:
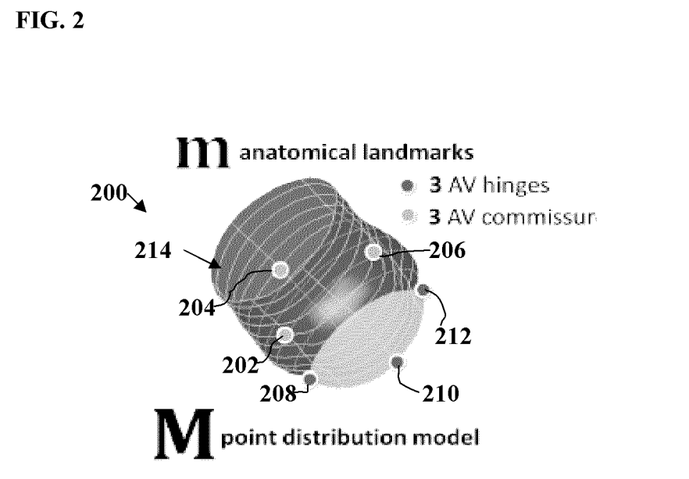
FIG. 2 illustrates a physiological model of the aortic valve, according to an embodiment of the present invention.

At step 104, a patient-specific aortic valve model is detected in the CT volume. In particular, a physiological model of the aortic valve that is capable of capturing complex morphological and pathological variations is fit to the CT volume in order to estimate the patient-specific aortic valve model for the patient. FIG. 2 illustrates a physiological model of the aortic valve, according to an embodiment of the present invention. As shown in FIG. 2, the anatomical structures represented in the aortic valve model 200 include six anatomical landmarks, three aortic valve commissures 202, 204, and 206 and three aortic valve hinges 208, 210, and 212, as well as the aortic root 214. To efficiently handle the anatomical complexity, the model representation and corresponding parameterization is constructed hierarchically and includes: a global affine model, a non-rigid landmark model m representing the anatomical landmarks 202, 204, 206, 208, 210, and 212, and a full surface model M of the aortic root 214.

The global position of the aortic valve model in a CT volume is parameterized with a similarity transformation in the three-dimensional Cartesian space:

$$\Theta=\{(c_x,c_y,c_z),(\vec{\alpha}_x,\vec{\alpha}_y,\vec{\alpha}_z),(s_x,s_y,s_z)\} \quad (1)$$

where $(c_x, c_y, c_z)$, $(\vec{\alpha}_x, \vec{\alpha}_y, \vec{\alpha}_z)$, and $(s_x, s_y, s_z)$ are the position, orientation, and scale parameters, respectively. The position is given by the aortic valve's gravity center, while scale parameters are chosen such that the entire anatomy of the aortic valve is included in a bounding box corresponding to the affine parameterization. The orientation of the long axes is defined by the normal vectors to the aortic-commissural plane, while the short axes are oriented to point from the gravity center to the LR-commissure. The next complexity level of the aortic valve model is modeled by six anatomical landmarks: R-, N-, and L-hinges 208, 210, and 212, respectively, and LR-, RN-, NL-commissures 202, 204, and 206, respectively. The highest abstraction layer of the aortic valve model models the 3D surface of the aortic root 214. The aortic root 214 is represented by a tubular grid, which is aligned with the aortic circumferential direction u and ascending directions v. In a possible implementation, the aortic root surface model includes 36×20 vertices and 1368 faces.

Figure 3:
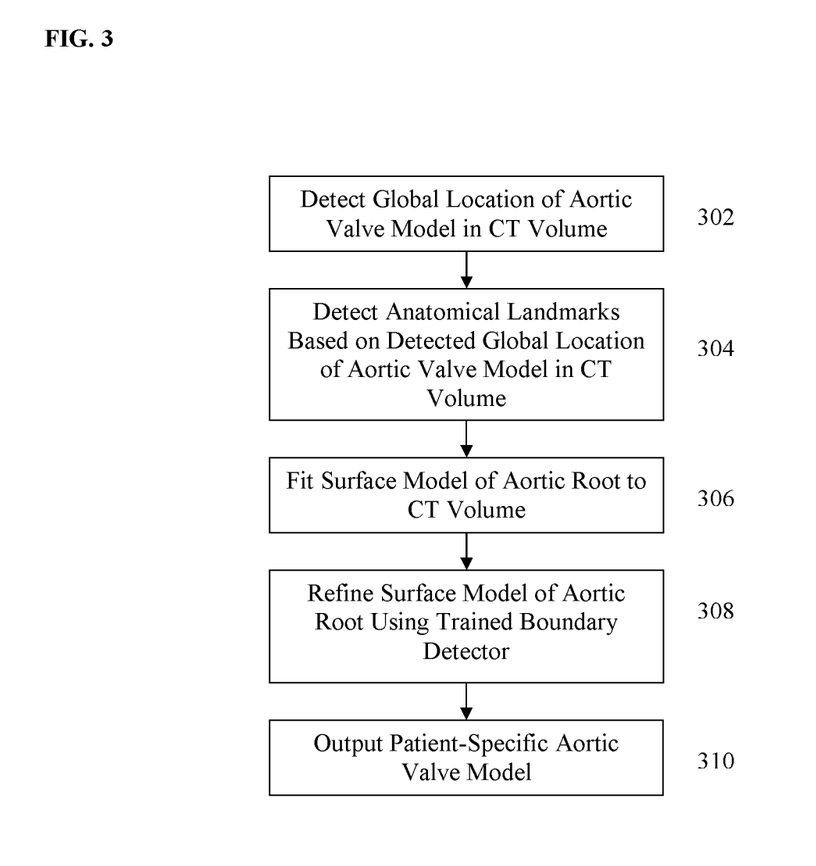
FIG. 3 illustrates a method for estimating the patient-specific aortic valve model in a CT volume according to an embodiment of the present invention.

In order to maximize efficiency and comply with the hierarchical model definition, the patient specific aortic valve model is estimated in the CT volume of the patient using an estimation algorithm that is based on robust learning methods and includes a global localization stage, an anatomical landmark estimation stage, and a surface model fitting stage. FIG. 3 illustrates a method for estimating the patient-specific aortic valve model in a CT volume according to an embodiment of the present invention.

Referring to FIG. 3, at step 302, the global location of the aortic valve model is detected in the CT volume. The global location is represented by the 3D affine parameters $(c_x, c_y, c_z, \alpha_x, \alpha_y, \alpha_z, s_x, s_y, s_z)$. These parameters define a bounding box corresponding to the global location of the aortic valve model in the CT volume, and are defined by combining anatomy detectors trained using the Marginal Space Learning (MSL) framework. MSL provides an efficient technique for learning high dimensional models and fast online searching by operating in subspaces of increasing dimensionality:

$$\Sigma_1 = (c_x, c_y, c_z)$$

$$\Sigma_2 = (c_x, c_y, c_z, \vec{\alpha}_x, \vec{\alpha}_y, \vec{\alpha}_z).$$

$$\Sigma_3 = (c_x, c_y, c_z, \vec{\alpha}_x, \vec{\alpha}_y, \vec{\alpha}_z, s_x, s_y, s_z)$$

Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object detection (global location estimation) is split into three steps: object position estimation, position-orientation estimation, and position-orientation-scale estimation. A separate classifier is trained based on annotated training data for each of these steps. Each classifier can be trained using a probabilistic boosting tree (PBT) in combination with Haar and/or steerable features based on a set of annotated training data. This results in the estimated affine transformation (position, orientation, and scale) defining a bounding box representing the global location of the aortic valve model in the CT volume. MSL is described in greater detail in U.S. Pat. No. 7,916,919, issued Mar. 29, 2011, and entitled "System and Method for Segmenting Chambers of a Heart in a Three Dimensional Image", which is incorporated herein by reference. In an exemplary implementation, the estimation of the global location of the aortic valve model can be performed on a 3 mm resolution.

At step 304, anatomic landmarks are detected in the 3D volume based on the detected global location of the aortic valve model. In particular, constrained by the global location $\Theta$, the six aortic valve landmarks $m_1 \ldots m_6$ are detected in the CT volume using respective trained landmark detectors. An independent landmark detector is trained for each of the six aortic valve landmarks (3 commissures and 3 hinges). Each landmark detector can be trained as a PBT classifier using Haar features based on annotated training data. In an advantageous embodiment, positive and negative training samples for training each landmark detector are extracted only from detected global location regions of training images. The trained landmark detectors search for the respective landmarks in a smaller subspace of the CT volume constrained by the detected global location $\Theta$:

$$p(m_i|I(t))=p(m_i|\Theta(t)) \; i=1 \ldots 6. \quad (2)$$

As the search space is constrained to the bounding box corresponding to the detected global location, the landmark detection may be performed on a finer resolution than the global localization. For example, the landmark detection may be performed on a 1 mm isotropic resolution. In this case, the landmark detectors are also trained at the finer resolution.

At step 306, a surface model of the aortic root is fit to the CT volume. The surface model of the aortic root is estimated using a non-rigid MSL framework. In particular, a search space is defined by a number of modes of a statistical shape model of the aortic root learned from the ground truth meshes in the set of training data. The statistical shape model can be generated from the training data using principle component analysis (PCA) in order to represent variations in the ground truth aortic root meshes in the training data. In an advantageous embodiment, the search space for the aortic root surface model can be defined by the first three modes $(c_1, c_2, c_3)$ of the statistical shape model computed from the training data. Each hypothesis in $c_1, c_2, c_3$ (i.e., each sample point in the statistical shape space) corresponds to a non-rigid shape. In order to learn which coefficients for the statistical shape model best correspond to the shape of the aortic root in the CT volume, each sample from $(c_1, c_2, c_3)$ is used to generate a non-rigid shape of the aortic valve, which is projected to the image space using the detected global localization $\Theta$. This results in a set of hypotheses for the aortic root surface model. A trained classifier is used select the best hypothesis from the set of surface model hypotheses as the aortic root surface model. This classifier can be a boosting classifier trained based on ground truth aortic root surface models in the training data and steerable features extracted around the non-rigid shape points of the surface model hypotheses. Accordingly, for each surface model hypothesis projected to the detected global location in the CT volume, steerable features are extracted in a neighborhood surrounding each model point and a probability score for the hypothesis is determined by the trained classifier based on the extracted steerable features. The surface model hypothesis having the highest probability score is selected as the aortic root surface model.

At step 308, the shape of the aortic root surface model is locally refined using a trained boundary detector. The trained boundary detector can be trained based on the training data using a PBT classifier and steerable features. The boundary of the aortic root surface model is refined by applying the trained classifier locally in a neighborhood of each point on the aortic root surface model to search in a normal direction for a point having a highest probability score.

Figure 4:
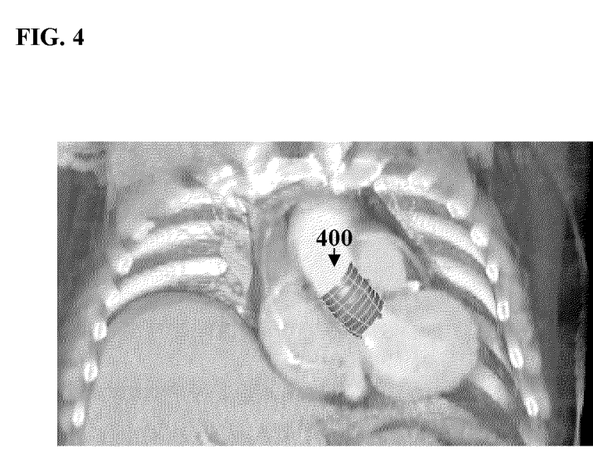
FIG. 4 illustrates an exemplary patient-specific aortic valve model detected in a CT volume.

At step 310, the patient-specific aortic valve model is output. For example, the patient-specific aortic valve model can be output by displaying the patient-specific aortic valve model on a display of a computer system. The patient-specific aortic valve model can also be output by storing the patient-specific aortic valve model on a memory or storage of a computer system. FIG. 4 illustrates an exemplary patient-specific aortic valve model 400 detected in a CT volume.

Returning to FIG. 1, at step 106, angulation parameters and anatomic measurements are automatically determined based on the detected patient-specific aortic valve model. The viewing orientation of a C-arm system is characterized by primary and secondary anatomic view angles. The primary angle (RAO/LAO) refers to how much a C-arm has been rotated with respect to a patient's right/left side (right anterior oblique/left anterior oblique). The secondary angle (CRAN/CAUD) refers to how much a C-arm has been angulated toward a patient's head (cranial) or feet (caudal). These angulation parameters are automatically determined based on the patient-specific aortic valve model. In particular, the aortic valve annulus plane is defined the three hinge anatomical landmarks, and the primary and second angulations parameters are automatically determined such that the viewing orientation of the C-arm system is orthogonal to the annulus plane. In an intervention, such as a TAVI procedure, the C-arm system can then acquire fluoroscopic images at the automatically determined viewing orientation to guide the procedure.

In addition, anatomical measurements, such as the aortic root annulus radius, as well as diameter and circumferential measurements along the entire aortic valve model can be automatically determined by the patient-specific aortic valve model. Such anatomical parameters of the aortic valve can be used to select a proper size for an artificial valve for a TAVI procedure.

Although the above described methods utilize CT for the automated intervention planning, the method may be similarly applied to extract a patient-specific aortic valve in other types of imaging modalities, such as magnetic resonance (MR), ultrasound, etc.

Figure 5:
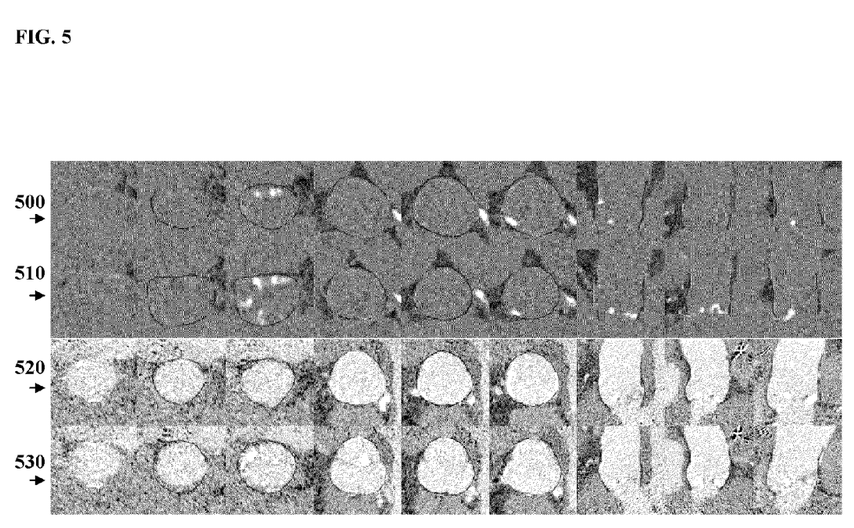
FIG. 5 illustrates exemplary results for detecting a patient-specific aortic valve model in noisy CT datasets.

Embodiment of the present invention described above provide automatic planning for tanscatheter aortic valve procedures. Embodiments of the present invention estimate a high-quality patient-specific model of the aortic valve and derive relevant clinical parameters for C-arm fluoroscopy angulations and annulus measurements. Fast and robust machine learning techniques are employed to estimate the final aortic valve model parameters from a single phase CT image. Embodiments of the present invention can speed up the current clinical workflow for TAVI planning while allowing precise intra-operative angulations estimations and accurate annulus measurements, which are important to determined proper implant dimensions. Extensive qualitative and quantitative experiments by the present inventors demonstrate that the above described methods are able to cope with a large variety of low-contrasted and noisy CT data. FIG. 5 illustrates exemplary results for detecting the patient-specific aortic valve model in noisy CT datasets. As illustrated in FIG. 5, row 500 shows ground truth aortic valve annotations for a first CT data set and row 510 shows aortic valve model detection results for the first CT data set. Row 520 shows ground truth aortic valve annotations for a second CT data set and row 530 shows aortic valve model detection results for the second CT data set.

Figure 6:
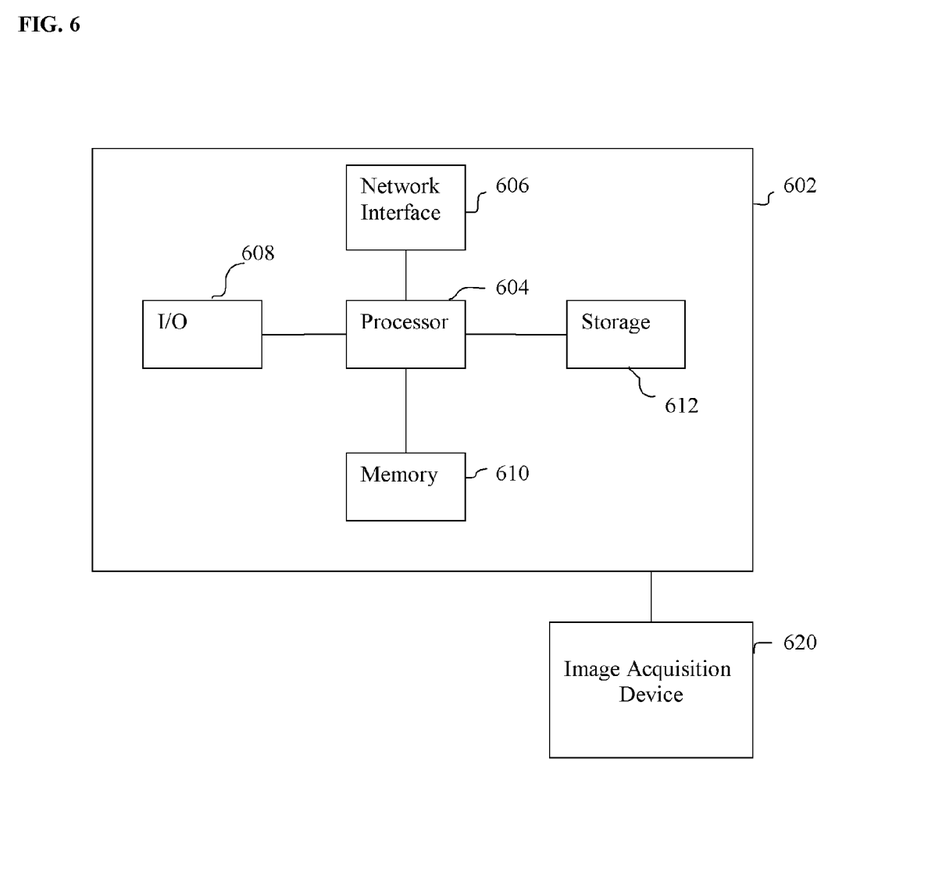
FIG. 6 is a high-level block diagram of a computer capable of implementing the present invention.

The above-described methods for intervention planning and for estimating a patient-specific aortic valve model from CT data may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 3 may be defined by the computer program instructions stored in the memory 610 and/or storage 612 and controlled by the processor 604 executing the computer program instructions. An image acquisition device 620, such as a CT scanner, can be connected to the computer 602 to input image data to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for intervention planning for a transcatheter aortic valve implantation, comprising:
   detecting a patient-specific aortic valve model in a computed tomography (CT) volume of a patient by:
      detecting a global location of the patient-specific aortic valve model in the CT volume,
      detecting a plurality of aortic valve landmarks in the CT volume based on the detected global location of the patient-specific aortic valve model, and
      fitting an aortic root surface model to the CT volume; and
   automatically determining at least one intervention parameter based on the patient-specific aortic valve model,
   wherein detecting a plurality of aortic valve landmarks in the CT volume based on the detected global location of the patient-specific aortic valve model comprises:
      detecting the plurality of aortic valve landmarks using a corresponding plurality of trained landmark detectors constrained by the detected global location of the patient-specific aortic valve model.

2. The method of claim 1, wherein the patient-specific aortic valve model comprises a global affine model, a landmark model including a three aortic valve commissure landmarks and three aortic valve hinge landmarks, and an aortic root surface model.

3. The method of claim 1, wherein detecting a global location of the patient-specific aortic valve model in the CT volume comprises:
   detecting an affine transformation defining the global location of the patient-specific aortic valve model in the CT volume using Marginal Space Learning (MSL).

4. The method of claim 1, wherein detecting a plurality of aortic valve landmarks in the CT volume based on the detected global location of the patient-specific aortic valve model comprises:
   detecting, in a search space constrained by the detected global location, each of three aortic valve hinges and three aortic valve commissures using a respective trained landmark detector.

5. The method of claim 1, wherein the global location of the patient-specific aortic valve model in the CT volume is detected at a first resolution and the plurality of aortic valve landmarks are detected at a second resolution that is finer than the first resolution.

6. The method of claim 1, wherein fitting an aortic root surface model to the CT volume comprises:
   generating a plurality of aortic valve shapes from a learned statistical shape model;
   projecting each of the plurality of aortic valve shapes to an image space of the CT image using the detected global location of the patient-specific aortic valve model, resulting in a plurality of surface model hypotheses; and
   selecting one of the surface model hypotheses as the aortic root surface model using a trained classifier.

7. The method of claim 1, wherein detecting a patient-specific aortic valve model in a computed tomography (CT) volume of a patient further comprises:
   refining the aortic root surface model using a trained boundary detector.

8. The method of claim 1, wherein automatically determining at least one intervention parameter based on the patient-specific aortic valve model comprises:
   automatically determining angulation parameters for a C-arm imaging system for obtaining intra-operative fluoroscopic images.

9. The method of claim 8, wherein automatically determining angulations parameters for a C-arm imaging system for obtaining intra-operative fluoroscopic images comprises:
   defining an annulus plane based on hinge landmark points in the patient-specific aortic valve model; and
   determining the angulation parameters such that a viewing orientation of the C-arm imaging system is orthogonal to the annulus plane.

10. The method of claim 1, wherein automatically determining angulations parameters for a C-arm imaging system for obtaining intra-operative fluoroscopic images comprises:
    determining an annulus measurement from the patient-specific aortic valve model.

11. An apparatus for intervention planning for a transcatheter aortic valve implantations, comprising:
    means for detecting a patient-specific aortic valve model in a computed tomography (CT) volume of a patient comprising:
       means for detecting a global location of the patient-specific aortic valve model in the CT volume,
       means for detecting a plurality of aortic valve landmarks in the CT volume based on the detected global location of the patient-specific aortic valve model, and
       means for fitting an aortic root surface model to the CT volume; and
    means for automatically determining at least one intervention parameter based on the patient-specific aortic valve model,
    wherein the means for detecting a plurality of aortic valve landmarks in the CT volume based on the detected global location of the patient-specific aortic valve model comprises:
       means for detecting, in a search space constrained by the detected global location, each of three aortic valve hinges and three aortic valve commissures.

12. The apparatus method of claim 11, wherein the patient-specific aortic valve model comprises a global affine model, a landmark model including a three aortic valve commissure landmarks and three aortic valve hinge landmarks, and an aortic root surface model.

13. The apparatus of claim 11, wherein the means for fitting an aortic root surface model to the CT volume comprises:
    means for generating a plurality of aortic valve shapes from a learned statistical shape model;
    means for projecting each of the plurality of aortic valve shapes to an image space of the CT image using the detected global location of the patient-specific aortic valve model, resulting in a plurality of surface model hypotheses; and
    means for selecting one of the surface model hypotheses as the aortic root surface model using a trained classifier.

14. The apparatus of claim 11, wherein the means for automatically determining at least one intervention parameter based on the patient-specific aortic valve model comprises:
    means for automatically determining angulation parameters for a C-arm imaging system for obtaining intra-operative fluoroscopic images.

15. The apparatus of claim 11, wherein the means for automatically determining angulations parameters for a C-arm imaging system for obtaining intra-operative fluoroscopic images comprises:

means for determining an annulus measurement from the patient-specific aortic valve model.

16. A non-transitory computer readable medium storing computer program instructions for intervention planning for a transcatheter aortic valve implantation, the computer program instructions when executed on a processor cause the processor to perform operations comprising:
  detecting a patient-specific aortic valve model in a computed tomography (CT) volume of a patient by:
    detecting a global location of the patient-specific aortic valve model in the CT volume,
    detecting a plurality of aortic valve landmarks in the CT volume based on the detected global location of the patient-specific aortic valve model, and
    fitting an aortic root surface model to the CT volume; and
  automatically determining at least one intervention parameter based on the patient-specific aortic valve model,
  wherein detecting a plurality of aortic valve landmarks in the CT volume based on the detected global location of the patient-specific aortic valve model comprises:
    detecting, in a search space constrained by the detected global location, each of three aortic valve hinges and three aortic valve commissures using a respective trained landmark detector.

17. The non-transitory computer readable medium of claim 16, wherein the patient-specific aortic valve model comprises a global affine model, a landmark model including a three aortic valve commissure landmarks and three aortic valve hinge landmarks, and an aortic root surface model.

18. The non-transitory computer readable medium of claim 16, wherein fitting an aortic root surface model to the CT volume comprises:
  generating a plurality of aortic valve shapes from a learned statistical shape model;
  projecting each of the plurality of aortic valve shapes to an image space of the CT image using the detected global location of the patient-specific aortic valve model, resulting in a plurality of surface model hypotheses; and
  selecting one of the surface model hypotheses as the aortic root surface model using a trained classifier.

19. The non-transitory computer readable medium of claim 16, wherein detecting a patient-specific aortic valve model in a computed tomography (CT) volume of a patient further comprises:
  refining the aortic root surface model using a trained boundary detector.

20. The non-transitory computer readable medium of claim 16, wherein automatically determining at least one intervention parameter based on the patient-specific aortic valve model comprises:
  automatically determining angulation parameters for a C-arm imaging system for obtaining intra-operative fluoroscopic images.

21. The non-transitory computer readable medium of claim 20, wherein automatically determining angulations parameters for a C-arm imaging system for obtaining intra-operative fluoroscopic images comprises:
  defining an annulus plane based on hinge landmark points in the patient-specific aortic valve model; and
  determining the angulation parameters such that a viewing orientation of the C-arm imaging system is orthogonal to the annulus plane.

22. The non-transitory computer readable medium of claim 16, wherein automatically determining angulations parameters for a C-arm imaging system for obtaining intra-operative fluoroscopic images comprises:
  determining an annulus measurement from the patient-specific aortic valve model.

* * * * *